United States Patent
McCloskey et al.

(10) Patent No.: US 7,391,971 B2
(45) Date of Patent: Jun. 24, 2008

(54) METHOD AND SYSTEM FOR POWERING UP AN OPTICAL NETWORK

(75) Inventors: Michael Joseph McCloskey, Ottawa (CA); Allen Joseph Braun, Ottawa (CA); Eddie Kai Ho Ng, Ottawa (CA)

(73) Assignee: Alcatel-Lucent Canada Inc., Kanata, Ontario (CA)

( * ) Notice: Subject to any disclaimer, the term of this patent is extended or adjusted under 35 U.S.C. 154(b) by 707 days.

(21) Appl. No.: 10/621,413

(22) Filed: Jul. 18, 2003

(65) Prior Publication Data

US 2004/0071467 A1 Apr. 15, 2004

Related U.S. Application Data

(60) Provisional application No. 60/418,233, filed on Oct. 15, 2002, provisional application No. 60/430,970, filed on Dec. 5, 2002.

(51) Int. Cl.
*H04B 17/00* (2006.01)

(52) U.S. Cl. .............................. 398/38; 398/15; 398/33

(58) Field of Classification Search ............... 398/2–17, 398/26–32, 202–214
See application file for complete search history.

(56) References Cited

U.S. PATENT DOCUMENTS

| | | | |
|---|---|---|---|
| 6,178,025 B1 * | 1/2001 | Hardcastle et al. | 398/17 |
| 6,519,066 B2 * | 2/2003 | Seydnejad et al. | 398/32 |
| 6,959,149 B2 * | 10/2005 | Bragg et al. | 398/26 |
| 2003/0194233 A1 * | 10/2003 | Casanova et al. | 398/2 |
| 2004/0208516 A1 * | 10/2004 | Clark et al. | 398/26 |

* cited by examiner

*Primary Examiner*—Dzung D Tran
(74) *Attorney, Agent, or Firm*—Victoria Donnelly

(57) ABSTRACT

A method for powering up an optical network is provided. The method comprises remotely and safely increasing power to optical links in the optical network while monitoring signal levels in the network to discover installation errors, incorrect equipment configuration, and faulty components. In a modification to the method, attenuations of optical attenuators and gain values of optical amplifiers are set. The methods for powering up the optical network of the embodiments of the invention apply to both new optical networks and to new optical links added to pre-existing optical networks.

12 Claims, 3 Drawing Sheets

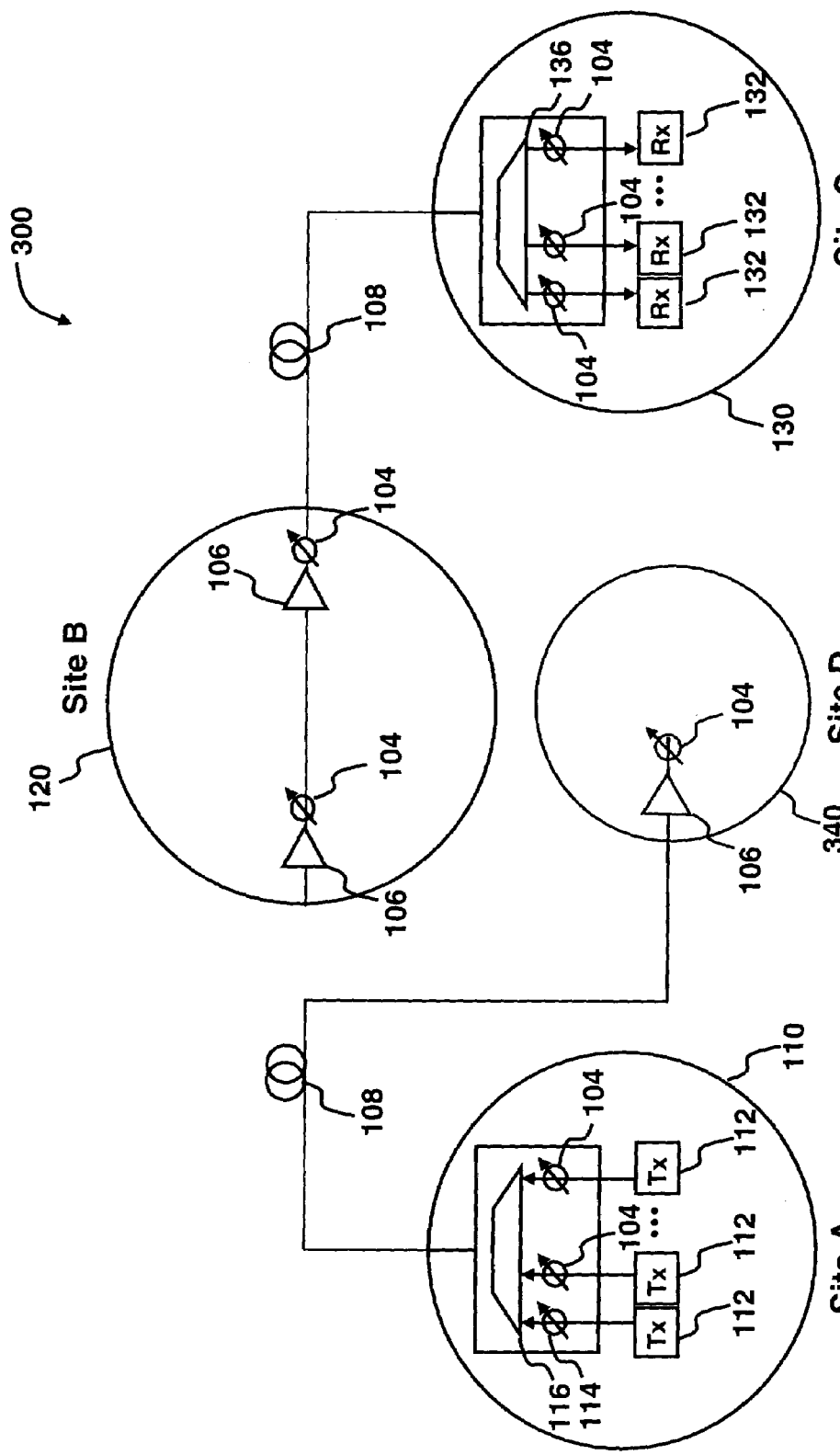

METHOD AND SYSTEM FOR POWERING UP AN OPTICAL NETWORK

RELATED APPLICATIONS

This application claims benefit from U.S. Provisional Patent Application to McCloskey et al., entitled "Method and System for Automatic Topology Verification and Initialization of an Optical Network", Ser. No. 60/418,233 filed on Oct. 15, 2002.

This application also claims benefit from U.S. Provisional Patent Application to McCloskey et al, entitled "System and Method for Powering Up an Optical Network", Ser. No. 60/430,970 filed on Dec. 5, 2002.

FIELD OF THE INVENTION

The present invention relates generally to optical networks, and in particular to a method and system for powering up an optical network.

BACKGROUND OF THE INVENTION

Optical networks, especially metropolitan area networks (MANs), are subject to numerous upgrades and reconfigurations because of the nature of MANs to provide dynamic connections in order to service growing and changing metropolitan areas.

Existing methods for powering up an optical network are manual, utilizing mobile, on-site optical measurement equipment. These methods are not performed remotely or automatically, and are labour intensive and error-prone.

When powering up new optical links in an optical network, it is possible to damage sensitive optical components or to disrupt existing optical links. This may occur due to cabling errors or the use of defective components.

Therefore, there is a need in industry for the development of alternative solutions for powering up an optical network that would be simple, automatic, remote, and would ensure the network is not damaged during the procedure.

SUMMARY OF THE INVENTION

Therefore there is an object of the invention to provide a method and system for powering up an optical network that would avoid or minimize the above-mentioned drawbacks.

According to one aspect of the invention, there is provided a method for powering up an optical network, comprising the steps of:

(a) selecting an optical link between a transmitter and a receiver in the optical network, the optical link being divided into a number of sections by monitoring points located between the transmitter and the receiver;

(b) selecting a first section of the optical link nearest to the transmitter in the optical network;

(c) gradually increasing optical power of an optical signal provided to the selected section of the optical link from the transmitter until the optical signal is detected at the monitoring point belonging to the selected section;

(d) verifying if the detected optical signal is being detected at a correct location according to a network specification and if the power of the detected optical signal is at the expected level according to the network specification;

(e) selecting a next section of the optical link adjacent to the previously selected section and further away from the transmitter in the optical network;

(f) repeating the steps (c) to (e) until all sections in the optical link have been selected.

The method may be performed on the link in the optical network remotely. Also, the step (a) of selecting an optical link may comprise selecting an optical link that has one section and one first monitoring point located at the receiver.

Additionally, the step (c) of gradually increasing the optical power may comprise increasing the optical power continuously.

Alternatively, the step (c) of gradually increasing optical power may comprise increasing the optical power in steps provided by sets of precalculated link budgets.

Beneficially, the step (c) of gradually increasing optical power may comprise decreasing attenuation of attenuators in the optical network and it may comprise detecting the optical signal at the monitoring point by detecting a dither tone modulated onto the signal.

In addition, the method may be performed on a pre-existing optical network so that pre-existing signals on the network are not being disturbed. In particular, the method may be performed such that pre-existing amplifier gain settings are not being changed.

In a modification to the method of the embodiment of the invention, the method further comprises the step of setting attenuation of attenuators and gain settings of amplifiers in the selected section, the step being performed after the step (d) of verifying.

In yet another modification to the method of the embodiment of the invention, the method further comprises the step of reconnecting the selected section of the optical link according to the network specification, if the step (d) of verifying gives the results that the detected optical signal is not being detected at the correct location.

According to another aspect of the invention, there is provided a system for powering up the optical network, comprising:

(a) means for selecting an optical link between a transmitter and a receiver in the optical network, the optical link being divided into a number of sections by monitoring points located between the transmitter and the receiver;

(b) means for selecting a first section of the optical link nearest to the transmitter in the optical network;

(c) means for gradually increasing optical power of an optical signal provided to the selected section of the optical link from the transmitter until the optical signal is detected at the monitoring point belonging to the selected section;

(d) means for verifying if the detected optical signal is being detected at a correct location according to a network specification and if the power of the detected optical signal is at the expected level according to the network specification;

(e) means for selecting a next section of the optical link adjacent to the previously selected section and further away from the transmitter in the optical network;

(f) means for repeating the steps (c) to (e) until all sections in the optical link have been selected.

The means (c) for gradually increasing optical power may comprise means for gradually increasing the optical power in steps provided by sets of precalculated link budgets.

The methods for powering up an optical network of the embodiments of the invention include monitoring of the network to prevent damage to the network during the procedure, e.g. due to configuration errors and/or defective components.

BRIEF DESCRIPTION OF THE DRAWINGS

Embodiments of the invention will now be described, by way of example, with reference to the accompanying drawings in which:

FIG. 3 is an exemplary optical network that has been misconnected used for illustrating the steps 212, 230, and 232 of verifying and repairing optical network misconnections.

DETAILED DESCRIPTION OF THE PREFERRED EMBODIMENTS

Figure 1:
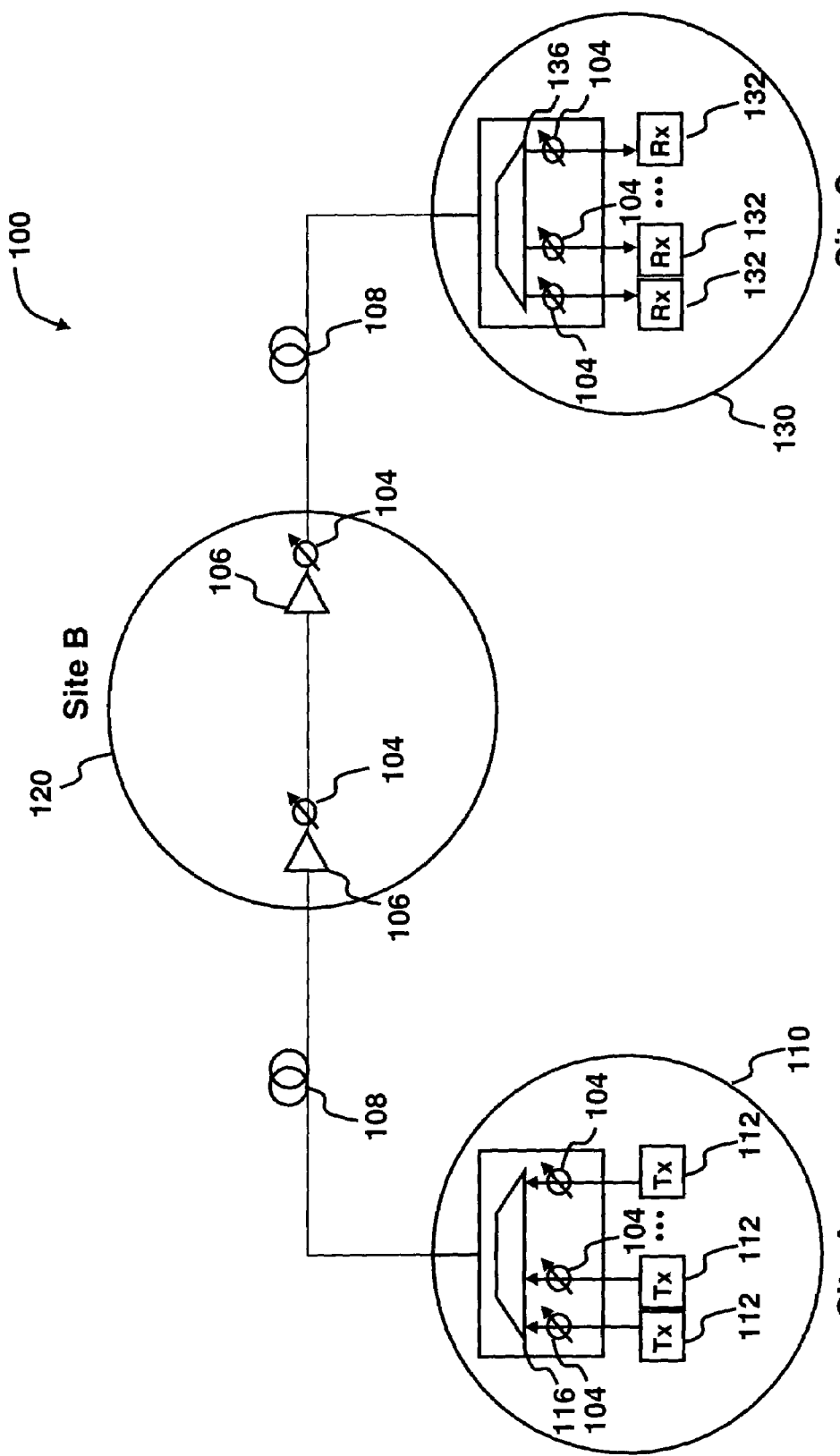
FIG. 1 is an exemplary optical network used for illustrating methods for powering up optical networks according to embodiments of the invention.

An exemplary optical network 100, implemented in the form of one optical link connecting a node at site "A" 110 to a node at site "C" 130, used for illustrating methods for powering up an optical network according to embodiments of the invention, is shown in FIG. 1. The node at site "A" 110 comprises a number of transmitters 112 with optical attenuators 104 at their outputs, transmitting signals that are combined by a multiplexer 116. The node at site "C" 130 comprises corresponding receivers 132 with optical attenuators 104 at their inputs, and a demultiplexer 136 separating the combined signal received from the node at site "A" 110. The optical link is further composed of spans of fiber 108 and an intermediate node at site "B" 120. The intermediate node 120 comprises optical amplifiers 106 with optical attenuators 104 at their outputs.

As is known in the art, optical networks can include an arbitrary number of optical amplifiers 106, transmitters 112, and receivers 132, the transmitters 112 and receivers 132 being located together or at different points in the optical network from one another. Also, the optical link may include an arbitrary number of intermediate nodes, and these nodes may include multiplexers 116 and demultiplexers 136 to add and drop optical signals at those intermediate nodes. Accordingly, FIG. 1 serves merely to illustrate one form of optical network for the purpose of describing embodiments of the invention.

The network 100 is powered up in the following manner. The powers of signals in the network are increased from a low power level to the operating level according to the methods of the embodiments of the invention as will be described in detail below with regard to FIG. 2.

Figure 2:
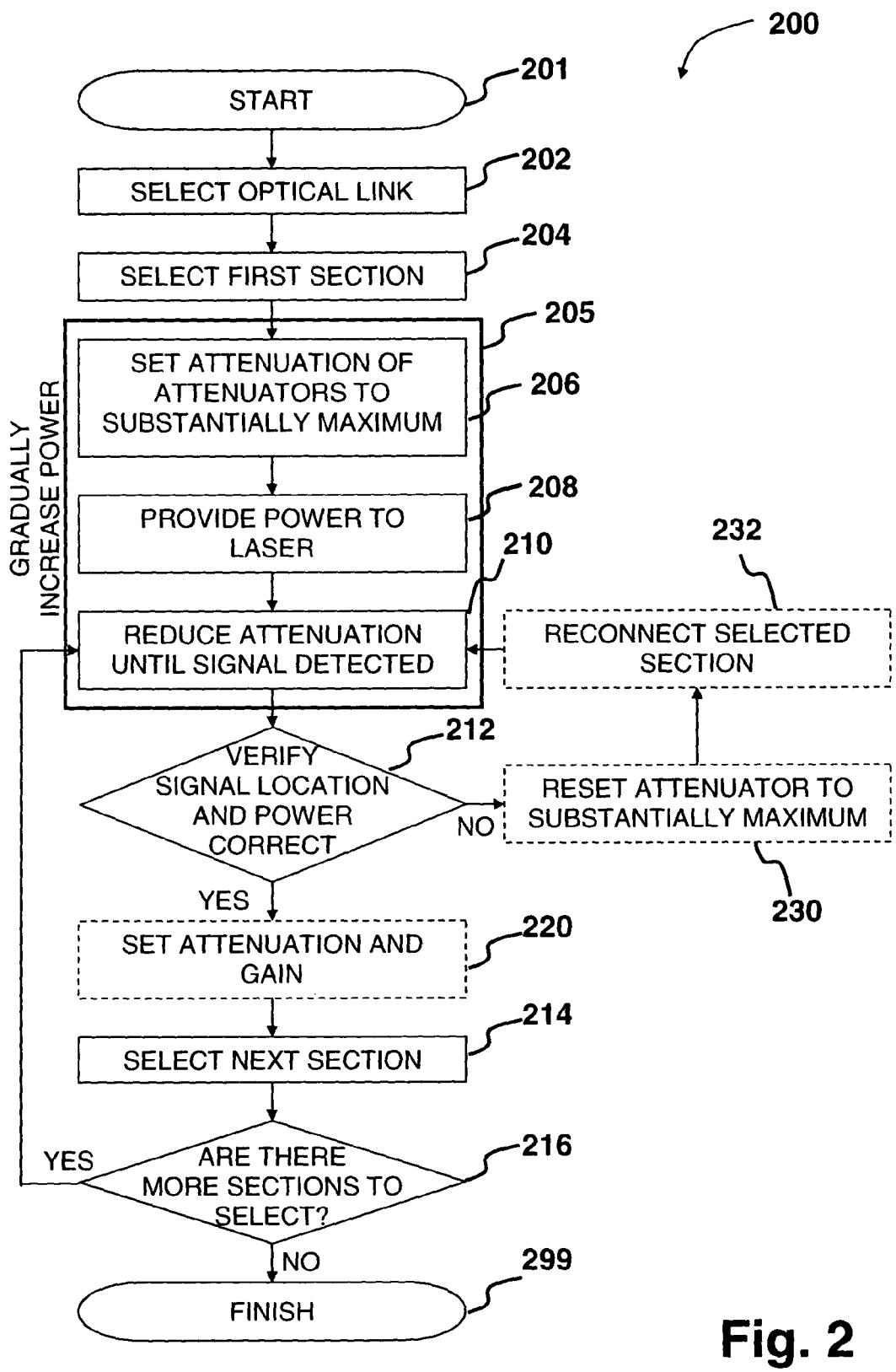
FIG. 2 is a flowchart illustrating the steps of the method for powering up optical networks according to the embodiment of the invention.

FIG. 2 is a flowchart 200 illustrating the steps of the method for powering up the optical link in the optical network 100 according to the first embodiment of the invention. The method is performed on one optical link at a time, and the optical network 100 illustrated in FIG. 1 has a single optical link between site "A" 110 and site "C" 130 as was mentioned above.

Upon start 201, the procedure 200 selects an optical link, the optical link being divided into a number of sections by monitoring points located between the transmitter and receiver (step 202). In the exemplary network 100, the optical link between site "A" 100 and site "C" 130 is selected.

Then, the procedure 200 selects a first section of the optical link nearest to the transmitter 112 (step 204). In the exemplary network 100, the first section of the optical link is the section between site "A" 100 and site "B" 120.

After the step 204, the procedure 200 gradually increases optical power of an optical signal provided to the selected section of the optical link from the transmitter 112 until the optical signal is detected at the monitoring point belonging to the selected section (step 205).

The procedure 200 then verifies if the detected optical signal is being detected at the correct location and if the power of the detected optical signal is at the expected level according to network specification (step 212) and proceeds to the step 214.

In the step 214, the procedure 200 selects a next section of the optical link adjacent to the previously selected section and further away from the transmitter 112 in the optical network. In the exemplary network 100, the next section selected in the step 214 is the section between site "B" 120 and site "C" 130.

Then, the procedure 200 checks whether there are more sections in the optical link to select (step 216), and if there are (exit "Yes" from step 216), then the procedure 200 repeats the steps 205, 212, and 214 until all sections in the optical link have been selected. If there are no more sections in the optical link to select (exit "No" from step 216), then the procedure is finished (step 299).

The method 200 may be performed on the optical link in the optical network remotely. Also, the optical link selected in the step 202 may have only one section and one first monitoring point located at the receiver.

Additionally, the step 205 of gradually increasing the optical power may comprise decreasing attenuation of attenuators in the optical network. Then, the step 205 may further comprise the steps 206 to 210 as illustrated in FIG. 2 of setting the attenuation of all optical attenuators 104 to substantially maximum attenuation (step 206), providing optical power of the optical signal to the selected section of the optical link from the transmitter 112 (step 208), and reducing the attenuation of an attenuator next in the optical link until the optical signal is detected at the monitoring point belonging to the selected section (step 210).

The step 205 of gradually increasing the optical power may comprise increasing the optical power continuously or in steps provided by sets of precalculated link budgets. The link budgets are a series of transmitter power levels and associated equipment settings. The minimum link budget is chosen to prevent damage to the receivers 132.

The signal may be detected downstream from the attenuator by, for example, detecting a modulation or dither tone on the carrier signal as disclosed in U.S. patent application Ser. No. 09/972,991 to Wan, P. W., et al, entitled "Channel Identification in Communications Networks", filed on Oct. 10, 2001; and as disclosed in U.S. patent application Ser. No. 10/067,748 to Wan, P. W., et al, entitled "Channel Identification in Communications Networks", filed on Feb. 8, 2002; and as disclosed in U.S. patent application Ser. No. 10/263,959 to Wan, P. W., et al, entitled "Channel Identification in Communications Networks", filed on Oct. 4, 2002.

Thus, an automatic method for powering up an optical network is provided that offers remote and timely monitoring of network configuration and equipment errors and ensures the network is not damaged from excessive power during the procedure.

In a modification to the method of the first embodiment, the procedure 200 further comprises the step 220 of setting attenuation of attenuators 104 and gain settings of amplifiers 106 in the selected section, the step being performed after the step 212 of verifying. Gain settings may be provided by methods such as those disclosed in U.S. patent application Ser. No. 10/443,058 to Ng, E. K. H., et al, entitled "Method for Determining Location and Gain Settings of Amplifiers in an Optical Network", filed on May 22, 2003; and as those disclosed in U.S. patent application Ser. No. 10/443,955 to Ng, E. K. H., et al, entitled "Method for Determining Location and Gain Settings of Amplifiers in an Optical Network by Using a Genetic Algorithm", filed on May 23, 2003.

The procedure 200 of FIG. 2 may also be performed on a pre-existing optical network so that pre-existing signals on the network are not being disturbed. This may be accomplished by, for example, ensuring that in the step 220 of setting the gain values of amplifiers 106, pre-existing amplifier gain settings are not changed.

Thus, a method for powering up an optical network is provided that offers automatic initialization of amplifier gain settings.

In another modification to the method of the first embodiment, the procedure 200 further comprises repairing the optical network 100 if the location at which the optical signal is detected is not correct (exit "No" from step 212) indicating that the optical network 100 has been misconnected. The procedure 200 then resets the attenuation of the attenuator of step 210 back to substantially maximum attenuation (step 230), reconnects the selected section according to the network specification (step 232), and returns to the step 210 of reducing attenuation.

Thus, a method for powering up an optical network is provided that includes a repair process. The method can also beneficially be employed during installation and initialization of the optical network.

The network 300 in FIG. 3 illustrates an example of a misconnection from Site "A" 110 to Site "D" 340. The signal from the transmitting site "A" 110 is not detected at the monitoring points in Site "B" 120 but rather at the monitoring points in Site "D" 340. The step 212 determines that the detected location is not correct according to the predetermined network specification. The attenuation of the attenuator is re-set to maximum attenuation (step 230) and the selected section is reconnected (step 232) until the optical signal is detected at the correct monitoring points in Site "B" 120. The resulting correctly connected optical network 100 is shown in FIG. 1.

It is apparent to those skilled in the art that there are many variations of the present invention that retain the spirit of the invention. Thus it is intended that the present invention cover the modifications, variations, and adaptations of this invention provided they fall within the scope of the following claims.

The invention claimed is:

1. A method for powering up an optical network, comprising the steps of:
   (a) selecting an optical link between a transmitter and a receiver in the optical network, the optical link being divided into a number of sections by monitoring points located between the transmitter and the receiver;
   (b) selecting a first section of the optical link nearest to the transmitter in the optical network;
   (c) gradually increasing optical power of an optical signal provided to the selected section of the optical link from the transmitter, including setting attenuation of attenuators on the optical link to substantially maximum attenuation and gradually decreasing the attenuation of the attenuators until the optical signal is detected at the monitoring point belonging to the selected section,
   the step (c) comprising detecting the optical signal at the monitoring point by detecting a dither tone modulated onto the optical signal to uniquely identify the optical signal;
   (d) verifying if the detected optical signal at the minimal detectable level is being detected at the correct location according to a network specification and if the power of the detected optical signal is at the expected level according to the network specification;
   (e) selecting a next section of the optical link adjacent to the previously selected section and further away from the transmitter in the optical network; and
   (f) repeating the steps (c) to (e) until all sections in the optical link have been selected.

2. A method as described in claim 1, wherein the step (a) of selecting an optical link comprises selecting an optical link that has one section and one first monitoring point located at the receiver.

3. A method as described in claim 1, wherein the step (c) of gradually increasing the optical power comprises increasing the optical power continuously.

4. A method as described in claim 1, further comprising the step of setting attenuation of attenuators and gain settings of amplifiers in the selected section, the step being performed after the step (d) of verifying.

5. A method as described in claim 4, wherein the step (c) of gradually increasing optical power comprises increasing the optical power in steps provided by sets of precalculated link budgets.

6. A method as described in claim 1, wherein the step (c) of gradually increasing optical power comprises detecting the optical signal at the monitoring point by detecting a dither tone modulated onto the signal.

7. A method as described in claim 1, further comprising the step of reconnecting the selected section of the optical link according to the network specification, if the step (d) of verifying gives the results that the detected dither tone is not being detected at the correct location, the step of reconnecting further comprising setting attenuation of the attenuators to substantially maximum attenuation.

8. A method as described in claim 1, the method being performed on a pre-existing optical network so that pre-existing signals on the network are not being disturbed.

9. A method as described in claim 8, the method being performed such that pre-existing amplifier gain settings are not being changed.

10. A method as described in claim 1, the method being performed on the link in the optical network remotely.

11. A system for powering up an optical network, comprising:
   (a) means for selecting an optical link between a transmitter and a receiver in the optical network, the optical link being divided into a number of sections by monitoring points located between the transmitter and the receiver;
   (b) means for selecting a first section of the optical link nearest to the transmitter in the optical network;
   (c) means for gradually increasing optical power of an optical signal provided to the selected section of the optical link from the transmitter, including setting attenuation of attenuators on the optical link to substantially maximum attenuation and gradually decreasing the attenuation of the attenuators until the optical signal is detected at the monitoring point belonging to the selected section, and detecting the optical signal at the monitoring point by detecting a dither tone modulated onto the optical signal to uniquely identify the optical signal;
   (d) means for verifying if the detected optical signal at the minimal detectable level is being detected at a correct location according to a network specification and if the power of the detected optical signal is at the expected level according to the network specification;

(e) means for selecting a next section of the optical link adjacent to the previously selected section and further away from the transmitter in the optical network; and (f) means for repeating the steps (c) to (e) until all sections in the optical link have been selected.

12. A system as described in claim 11, wherein the means (c) for gradually increasing optical power comprises means for gradually increasing the optical power in steps provided by sets of precalculated link budgets.

* * * * *